(12) United States Patent
Farre Guiu et al.

(10) Patent No.: US 11,288,097 B2
(45) Date of Patent: Mar. 29, 2022

(54) AUTOMATED HARDWARE RESOURCE OPTIMIZATION

(71) Applicant: Disney Enterprises, Inc., Burbank, CA (US)

(72) Inventors: Miquel Angel Farre Guiu, Bern (CH); Marc Junyent Martin, Barcelona (ES); Jordi Badia Pujol, Madrid (ES)

(73) Assignee: Disney Enterprises, Inc., Burbank, CA (US)

( * ) Notice: Subject to any disclaimer, the term of this patent is extended or adjusted under 35 U.S.C. 154(b) by 130 days.

(21) Appl. No.: 16/900,583

(22) Filed: Jun. 12, 2020

(65) Prior Publication Data

US 2021/0389989 A1 Dec. 16, 2021

(51) Int. Cl.
| | |
|---|---|
| *G06F 9/50* | (2006.01) |
| *G06N 3/063* | (2006.01) |
| *G06F 9/48* | (2006.01) |
| *G06F 9/445* | (2018.01) |
| *G06N 3/04* | (2006.01) |

(52) U.S. Cl.
CPC ........ *G06F 9/5016* (2013.01); *G06F 9/44505* (2013.01); *G06F 9/4881* (2013.01); *G06F 9/5072* (2013.01); *G06N 3/0454* (2013.01); *G06N 3/063* (2013.01)

(58) Field of Classification Search
CPC ................................................. G06F 9/5012
See application file for complete search history.

(56) References Cited

U.S. PATENT DOCUMENTS

| | | |
|---|---|---|
| 10,438,113 B2 | 10/2019 | Steiner et al. |
| 2019/0325307 A1 | 4/2019 | Li et al. |
| 2019/0156246 A1 | 5/2019 | Kuo et al. |
| 2019/0303761 A1 | 6/2019 | Bengio et al. |

(Continued)

OTHER PUBLICATIONS

"Device Placement Optimization with Reinforcement Learning," https://arxiv.org/pdf/1706.04972.pdf, Mirhoseini et al., Jun. 25, 2017, pp. 1-2, 6.

(Continued)

*Primary Examiner* — Charlie Sun
(74) *Attorney, Agent, or Firm* — Farjami & Farjami LLP

(57) ABSTRACT

An automated hardware resource optimization system includes a computing platform having a hardware processor and a system memory storing a software code. The hardware processor is configured to execute the software code to identify computing hardware for hosting a neural network based application, determine, based on a first performance parameter of the computing hardware, a batch size for performing data processing using the neural network based application, and tune, using a data batch having the determined batch size, a second performance parameter of the computing hardware to enable substantially continuous loading of its hardware processor memory. The software code also optimizes, based on the determined batch size and the tuned second performance parameter, a process flow for performing the data processing, and generates a configuration file identifying the computing hardware, the neural network based application, the determined batch size, the tuned second performance parameter, and the optimized process flow.

20 Claims, 4 Drawing Sheets

(56) References Cited

U.S. PATENT DOCUMENTS

| | | |
|---|---|---|
| 2019/0266015 A1 | 8/2019 | Chandra et al. |
| 2020/0026997 A1 | 1/2020 | Yang |
| 2020/0042362 A1 | 9/2020 | Cui et al. |
| 2020/0301723 A1* | 9/2020 | Gabrielson .............. G06N 3/08 |
| 2020/0302285 A1* | 9/2020 | Wang .................... G06N 20/10 |

OTHER PUBLICATIONS

"Efficient Deep Learning Inference on Edge Devices," https://mlsys.org/Conferences/2019/doc/2018/29.pdf Jiang et al., Apr. 2018, pp. 1-2.

Extended european Search Report dated Nov. 4, 2021.

Wenbin Jiang, Yang Ma, Bo Liu, Haikun Liu, Bing Bing Zhou, Jian Zhu, Song Wu and Hai Jin "Layup: Layer-adaptive and Multi-type Intermediate-oriented Memory Optimization for GPU-based CNNs" ACM Transactions on Architecture and Code Optimization, vol. 16, No. 4, Article 39, Oct. 11, 2019. pp. 1-23.

\* cited by examiner

AUTOMATED HARDWARE RESOURCE OPTIMIZATION

BACKGROUND

An artificial neural network, also known simply as a neural network, is a type of machine learning framework in which patterns or learned representations of observed data are processed using highly connected computational layers that map the relationship between inputs and outputs. A "deep neural network," in the context of deep learning, can refer to a neural network that utilizes multiple hidden layers between input and output layers, which may allow for learning based on features not explicitly defined in raw data. Various forms of neural networks may be used to make predictions about new data based on past examples or "training datasets." In various implementations, deep neural networks may be trained as classifiers and may be utilized to perform image processing or natural-language processing, for example.

Deep neural network based applications typically require powerful computing resources for training and at run time. Moreover, such applications usually have resource-consuming preprocessing steps. As a result, it is important to properly dimension and configure the computing hardware on which those neural network based applications are to be trained or run. However, the hardware that hosts a neural network based application can be heterogeneous hardware resources having a variety of different hardware configurations. Furthermore, the hardware computing environment in which a neural network based application is executed may be shared with other applications, resulting in some variability in the hardware available to host the neural network based application at any particular time. Consequently, there is a need in the art for a solution for dynamically configuring available computing hardware to optimize the performance of a neural network based application hosted by that hardware.

SUMMARY

There are provided automated hardware resource optimization systems, and methods for use by such systems, substantially as shown in and/or described in connection with at least one of the figures, and as set forth more completely in the claims.

DETAILED DESCRIPTION

Figure 1:
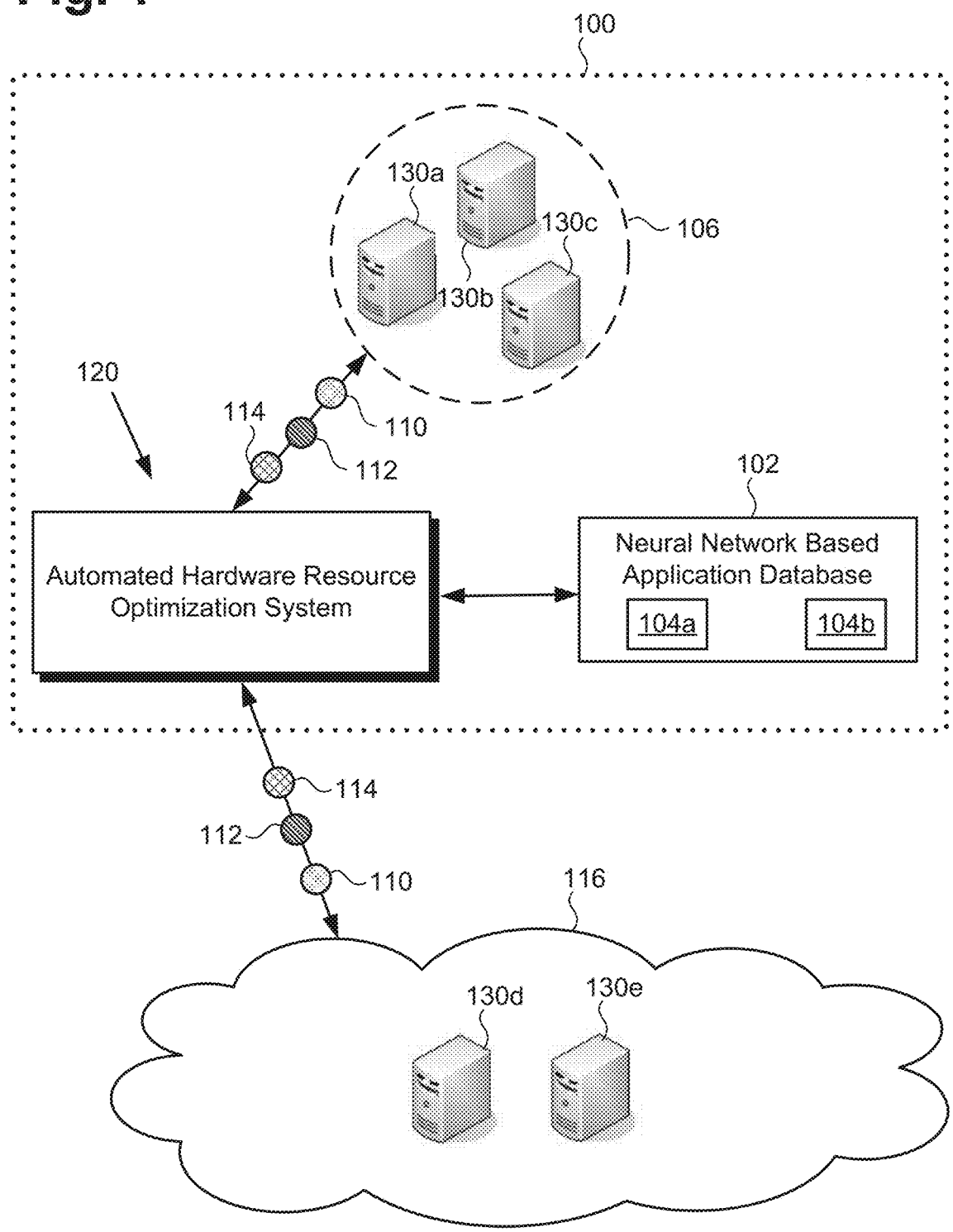
FIG. 1 shows a diagram of an exemplary hardware resource optimization system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, deep neural network based applications typically require powerful computing resources for training and at run time. Moreover, such applications usually have resource-consuming preprocessing steps. As a result, it is important to properly dimension and configure the computing hardware on which those neural network based applications are to be trained or run. However, the hardware that hosts a neural network based application can be heterogeneous, while the hardware computing environment may be shared with other applications, resulting in some variability in the hardware available to host the neural network based application at any particular time.

With respect to the term "heterogeneous" as applied to computing hardware, it is noted that for the purposes of the present application, heterogeneous hardware is defined to be two or more hardware elements having different configurations. Examples of different hardware configurations include different types or numbers of central processing units (CPUs), different sizes or speeds of memories or disks, the presence or absence of a graphics processing unit (GPU) as well as differences in their types or numbers when present, network connection speeds, and/or the presence or absence of other attached devices, such as tensor processing units (TPUs), to name a few.

The present application discloses automated hardware resource optimization systems, and methods for use by such systems, that overcome the drawbacks and deficiencies in the conventional art by dynamically configuring available computing hardware to suit a neural network based application to be hosted by that hardware. It is noted that, as used in the present application, the terms "automation," "automated", and "automating" refer to systems and methods that do not require the participation of a human user, such as a network administrator. Although, in some implementations, a human operator or administrator may review the performance of the automated systems executing the automated methods described herein, that human involvement is optional. Thus, the methods described in the present application may be performed under the control of hardware processing components described herein.

Moreover, and as noted above, a neural network, is a type of machine learning framework in which patterns or learned representations of observed data are processed using highly connected computational layers that map the relationship between inputs and outputs. A "deep neural network," in the context of deep learning, can refer to a neural network that utilizes multiple hidden layers between input and output layers, which may allow for learning based on features not explicitly defined in raw data. As used in the present application, a feature described as a "neural network based application" is an integrated software application that includes one or more embedded deep neural networks. Thus, in some implementations, a neural network based application may include a single neural network, while in other implementations a neural network based application may include multiple neural networks, which may be configured to perform data processing tasks sequentially, in parallel, or in a combination of sequential and parallel operations.

Although the disclosure in the present application focuses on hardware resource optimization for neural network based applications, that emphasis is due to the powerful computing resources and the resource intensive preprocessing steps such applications often require. Nevertheless, the present hardware resource optimization solution may be advantageously utilized for other applications that do not include embedded neural networks. Other types of applications that may benefit from the present optimization solution include video shot segmentation applications, as well as various applications for transforming video, for example.

FIG. 1 shows a diagram of exemplary automated hardware resource optimization system 120, according to one implementation. As shown in FIG. 1, automated hardware resource optimization system 120 can be utilized in a use environment including local network 100 including local computing hardware 106, such as one or more of locally-based machines 130a, 130b, and/or 130c communicatively coupled to automated hardware resource optimization system 120. In addition, or alternatively, the use environment in which automated hardware resource optimization system 120 is utilized can include cloud-based computing hardware 116, such as one or more of remote, cloud-based machines 130d and/or 130e communicatively coupled to automated hardware resource optimization system 120.

As further shown in FIG. 1, automated hardware resource optimization system 120 is interactively linked to neural network based application database 102 storing one or more neural network based software applications, depicted in FIG. 1 as neural network based applications 104a and 104b. Also shown in FIG. 1 are test data 110, tuning data 112, and performance monitoring data 114 used by automated hardware resource optimization system 120 to optimize the performance of one or more of neural network based applications 104a and 104b when hosted by one or both of local computing hardware 106 and cloud-based computing hardware 116.

It is noted that although FIG. 1 shows cloud-based computing hardware 116 to be provided by a single cloud entity, that representation is merely exemplary. In other implementations, cloud-based computing hardware 116 may be provided by multiple different cloud-computing services. Moreover, the specific number of machines 130a, 130b, 130c, 130d, and 130e (hereinafter "machines 130a-130e") and neural network based applications 104a and 104b is merely exemplary. In other implementations, neural network based application database 102 may store one neural network based application, two neural network based applications, or more than two neural network based applications. Furthermore, local computing hardware 106 included in local network 100 may include a single machine, two machines, the three machines shown in FIG. 1, or more than three machines, while cloud-based computing hardware 116 may analogously include a single machine, the two machines shown in FIG. 1, or more than two machines.

Each of machines 130a-130e may be implemented as one or more computing platforms, such as computer servers for example. In one implementation, for example, machines 130d and 130e may correspond to one or more web servers, accessible by automated hardware resource optimization system 120 over a packet-switched network such as the Internet. By contrast, machines 130a, 130b, and 130c (hereinafter "machines 130a-130c") may correspond to one or more computer servers accessible by automated hardware resource optimization system 120 over a local area network (LAN), or another type of limited distribution or private network.

It is further noted that although machines 130a-130e are each depicted using the same image, that representation is merely exemplary as well. In other implementations, two or more of machines 130a-130e may be implemented as a heterogeneous combination of computing hardware each including its own processor and memory resources. It is also noted that although FIG. 1 depicts neural network based application database 102 as being included as part of local network 100, that representation is also merely exemplary. In other implementations, neural network based application database 102 may be remote from automated hardware resource optimization system 120 and may be accessible by automated hardware resource optimization system 120 via a public communication network such as the Internet.

Figure 2:
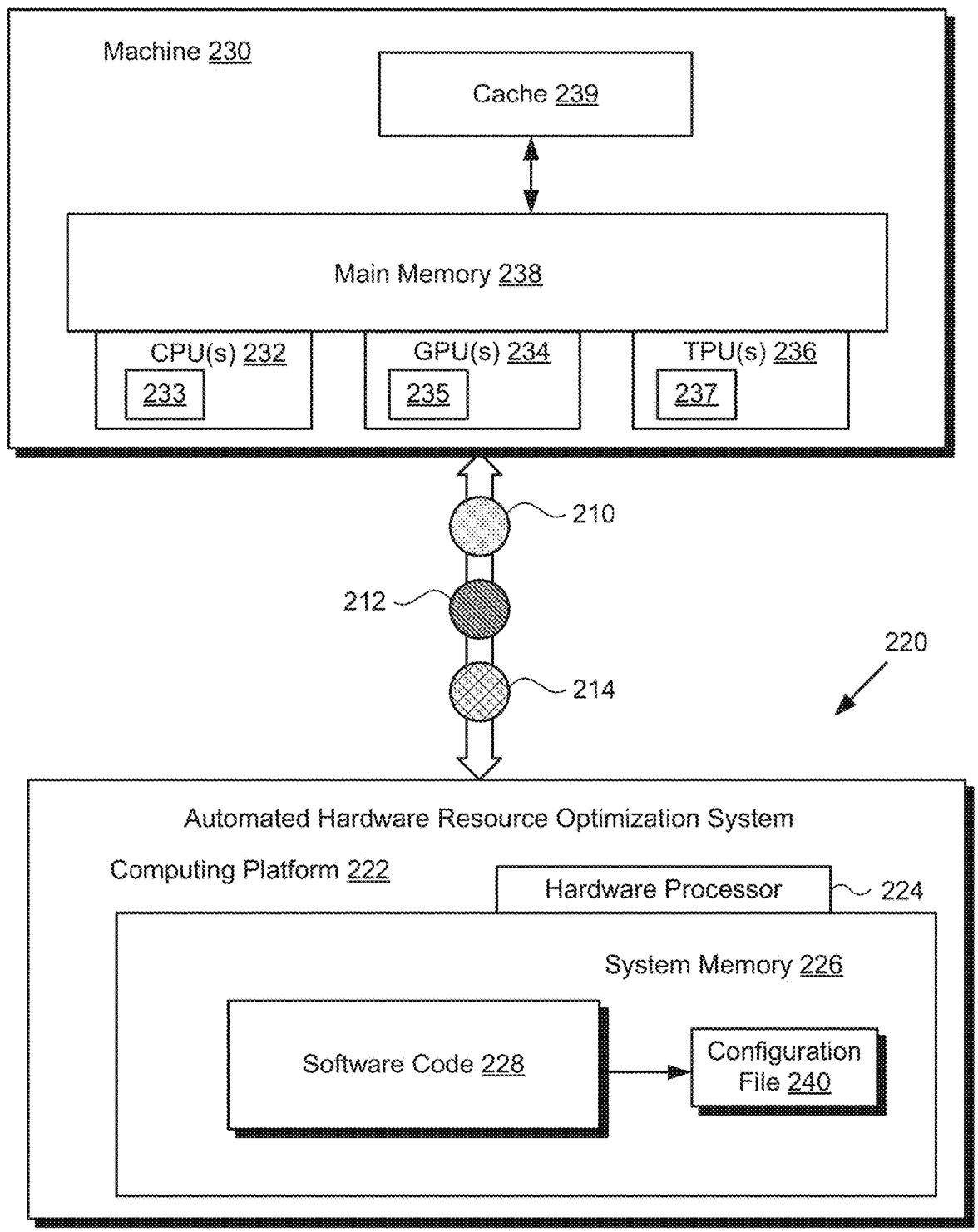
FIG. 2 shows a more detailed diagram of the hardware resource optimization system of FIG. 1 in combination with a hardware machine, according to one implementation.

FIG. 2 shows a more detailed diagram of automated hardware resource optimization system 220 in combination with machine 230, according to one implementation. Also shown in FIG. 2 are test data 210, tuning data 212, and performance monitoring data 214 used by automated hardware resource optimization system 220 to optimize the performance of one or more of neural network based applications 104a and 104b, in FIG. 1, when hosted by machine 230. Test data 210, tuning data 212, and performance monitoring data 214 correspond respectively in general to test data 110, tuning data 112, and performance monitoring data 114, in FIG. 1. Thus, test data 210, tuning data 212, and performance monitoring data 214 may share any of the characteristics attributed to respective test data 110, tuning data 112, and performance monitoring data 114 by the present disclosure, and vice versa.

As shown in FIG. 2, automated hardware resource optimization system 220 includes computing platform 222 having hardware processor 224, and system memory 226 implemented as a non-transitory storage device storing software code 228 and configuration file 240. Hardware processor 224 may be the CPU for computing platform 222, for example, in which role hardware processor 224 executes software code 228 to generate configuration file 240.

It is noted that, although the present application refers to software code 228 and configuration file 240 as being stored in system memory 226 for conceptual clarity, more generally, system memory 226 may take the form of any computer-readable non-transitory storage medium. The expression "computer-readable non-transitory storage medium," as used in the present application, refers to any medium, excluding a carrier wave or other transitory signal that provides instructions to hardware processor 224 of automated hardware resource optimization system 220. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Automated hardware resource optimization system 220, in FIG. 2, corresponds in general to automated hardware resource optimization system 120, in FIG. 1, and those corresponding features may share any of the characteristics attributed to either corresponding feature by the present disclosure. That is to say, although not shown in FIG. 1, automated hardware resource optimization system 120 may include features corresponding respectively to computing platform 222, hardware processor 224, and system memory 226 storing software code 228 for generating configuration file 240.

As further shown in FIG. 2, machine 230 may include one or more CPU(s) 232 each having CPU memory 233, one or more GPU(s) 234 each having GPU memory 235, one or more TPU(s) 236 each having TPU memory 237, main memory 238 implemented as a non-transitory storage device, such as a hard disc drive or solid state memory, for example, and memory cache 239. Machine 230, in FIG. 2, may correspond in general to any one, several, or all of machines 130a-130e, in FIG. 1. Thus, machines 130a-130e may share any of the characteristics attributed to machine 230 by the present disclosure, and vice versa. That is to say, although not shown in FIG. 1, machines 130a-130e may include features corresponding respectively to CPU(s) 232, GPU(s) 234, TPU(s) 236, main memory 238, and cache 239. Moreover, like one or more of machines 130a-130e, machine 230 may be a part of local computing hardware 106 included in local network 100, or may be included among cloud-based computing hardware 116.

Communications between automated hardware resource optimization system 120/220 and machine(s) 130a-130c/230 may occur as wired or wireless communications. When communication is performed wirelessly, the communications between automated hardware resource optimization system 120/220 and machine(s) 130a-130e/230 may be performed using the fourth generation (4G) wireless communication protocol, or using the 5G wireless communication protocol satisfying the IMT-2020 requirements established by the International Telecommunication Union (ITU). Alternatively, or in addition, wireless communications between automated hardware resource optimization system 120/220 and machine(s) 130a-130e/230 may occur via Wireless Fidelity (WiFi), Worldwide Interoperability of Microwave Access (WiMAX) communications, or any other suitable wireless communication protocol.

Figure 3A:
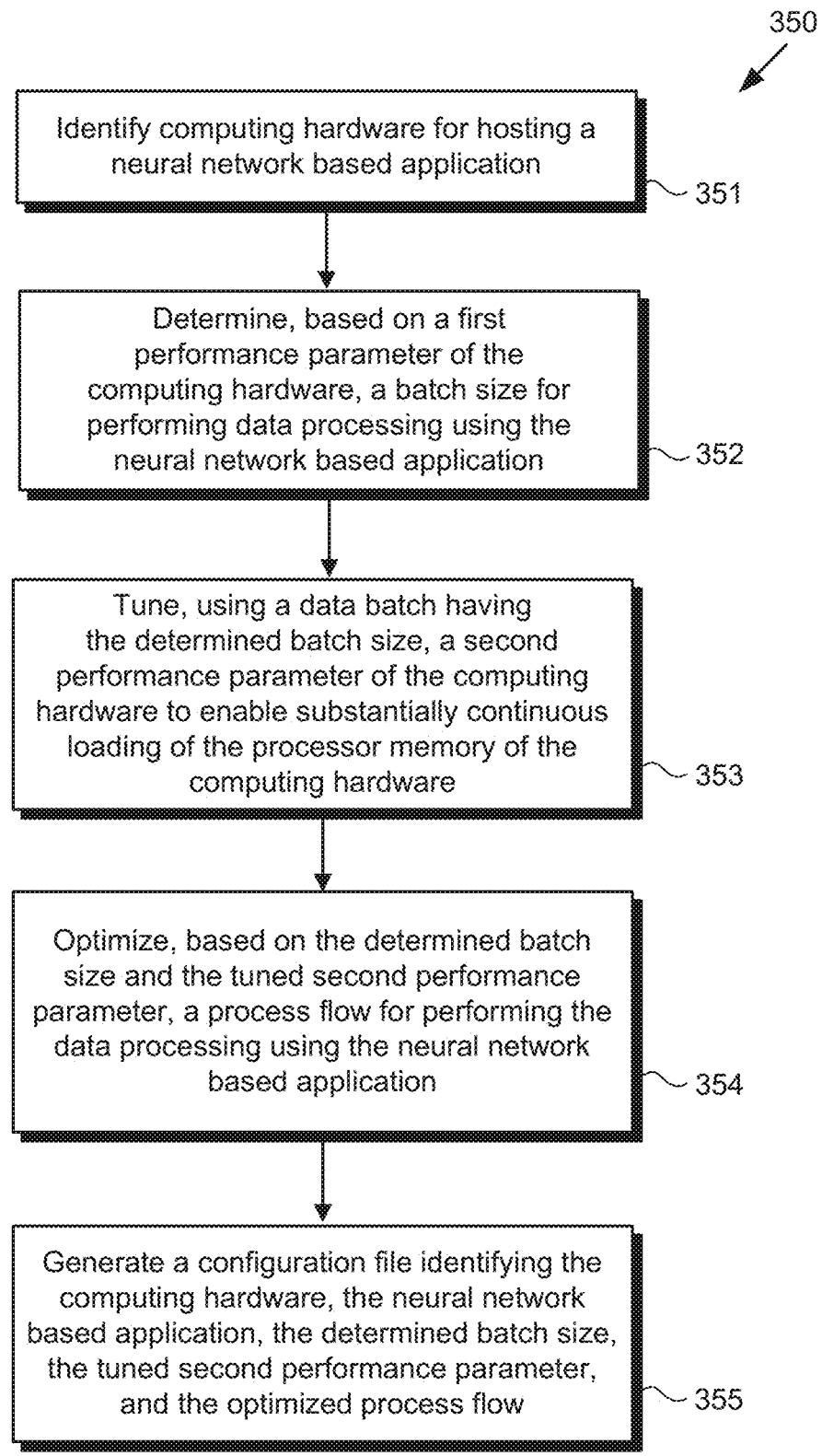
FIG. 3A is a flowchart presenting an exemplary hardware resource optimization method, according to one implementation.

The functionality of software code 228 will be further described by reference to FIG. 3A. FIG. 3A shows flowchart 350 presenting an exemplary hardware resource optimization method, according to one implementation. With respect to the method outlined in FIG. 3A, it is noted that certain details and features have been left out of flowchart 350 in order not to obscure the discussion of the inventive features in the present application.

Referring to FIG. 3A in combination with FIGS. 1 and 2, flowchart 350 begins with identifying computing hardware 106/116 for hosting neural network based application 104a or 104b (action 351). As noted above by reference to FIG. 1, the expression "neural network based application" refers to an integrated software application that includes one or more embedded deep neural networks. Neural network based applications 104a and 104b may include a single neural network, or multiple neural networks, which may be configured to perform data processing tasks sequentially, in parallel, or in a combination of sequential and parallel operations.

The neural network or neural networks included in neural network based applications 104a and 104b may be configured to perform facial recognition, object recognition, location recognition, and/or speech recognition, for example, inferentially. In some implementations, neural network based applications 104a and 104b may be configured to perform data processing by analyzing images or media content. When used to analyze media content, such content may include one or more audio-video files in the form of movies, episodic content including television shows or web-based shows, and video games, for example, as well as one or more video files from which audio is omitted, or one or more audio files such as music, or electronic text such as digital books or other publications.

Computing hardware 106/116 identified in action 351 may include one or more of machines 130a-130e/230. That is to say, computing hardware 106/116 identified in action 351 may include one or more of machines 130a-130c/230 included among local computing hardware 106 and/or one or more of machines 130d/230 and 130e/230 included among cloud-based computing hardware 116. Identification of computing hardware 106/116 for hosting one of neural network based applications 104a or 104b may be performed by software code 228, executed by hardware processor 224 of automated hardware resource optimization system 120/220. As noted above, machine 230 corresponds to any of machines 130a-130e included among computing hardware 106/116. Consequently, and in the interests of conceptual clarity, the features "computing hardware 106/116" and "machine 230" will be used synonymously in the following description of flowchart 350.

Flowchart 350 continues with determining, based on a first performance parameter of machine 230, a batch size for performing data processing using neural network based application 104a or 104b (action 352). Action 352 may be performed by software code 228, executed by hardware processor 224 of automated hardware resource optimization system 120/220. It is noted that the present hardware resource optimization solution may execute an initial performance evaluation to benchmark each machine 230 identified in action 351. This benchmark will enable software code 228 to optimize a process flow for performing the data processing using neural network based application 104a or 104b hosted by one or more machine(s) 230.

In some implementations, software code 228 may determine the maximum number of samples that will be propagated through neural network based application 104a or 104b at the same time, (i.e., the batch size). In order to determine the batch size, software code 228 may send test data 110/210 in the form of synthetic data in groups of different sizes to model and monitor the performance of machine 230. In some implementations, it may be advantageous or desirable to use GPU(s) 234 or TPU(s) 236 rather than CPU(s) 232 to perform data processing using neural network based application 104a or 104b due to typically faster neural network inferencing using a GPU or TPU. In some of those implementations, the first performance parameter used in determining the batch size may be GPU or TPU usage, as measured by GPU or TPU memory load during processing of test data 110/210 by machine 230. For example, software code 228 may monitor inference time of each batch included in test data 110/210, as well as the memory load of GPU(s) 234 or TPU(s) 236 during inference and may determine the batch size based on one or both of those performance GPU or TPU parameters. It is noted that the GPU or TPU memory load may serve as a particularly good proxy for determining batch size.

It is further noted that although the initial estimation of the performance parameters of machine 230 related to the deep learning architecture of the one or more neural networks included in neural network based application 104a or 104b may be done from scratch for each machine 230, as described above, in other implementations the benchmarking may be performed based on pre-existing data. For example, performance parameters of machine 230 may be obtained from public benchmarks, or as a result of previous benchmarking of similar neural network based applications on similar computing hardware.

Flowchart 350 continues with tuning, using a data batch having the batch size determined in action 352, a second performance parameter of machine 230 to enable substantially continuous loading of a hardware processor memory of machine 230 (action 353). Once the proper batch size has been determined in action 352, hardware processor 224 of automated hardware resource optimization system 120/220 may execute software code 228 to send tuning data 112/212 having the now determined batch size to machine 230 and to monitor GPU memory 235 or TPU memory 237 to substantially minimize the amount of time that GPU memory 235 or TPU memory 237 is empty (i.e., GPU or TPU memory load is intermittent). Thus, in some implementations, the second performance parameter tuned in action 353 may be the memory load rate of GPU(s) 234 or the memory load rate of TPU(s) 236. Alternatively, in other implementations, it may be advantageous or desirable to use the usage rate of GPU(s) 234 or the usage rate of TPU(s) 236.

GPU or TPU memory load intermittency is typically the result of a slow data load process. In response, software code 228 may increase the number of threads dedicated to load data into GPU memory 235 or TPU memory 237, as well as the shared memory between those threads until the memory load is persistently in a state of substantially constant data flow. If the GPU or TPU memory load continues to be intermittent, main memory 238 input/output (I/O) speed may be evaluated and in underperformance situations, software code 228 may recommend a hard disk update or the addition of some CPU threads to fill memory cache 239 faster.

In cases where machine 230 does not include TPU(s) 236, and the performance of GPU(s) 234 is inadequate for hosting neural network based application 104a or 104b, or the batch size determined in action 352 based on the performance of GPU(s) 234 is very small, the performance of CPU(s) 232 may also be evaluated. Although a CPU is usually slower than a GPU or TPU for performing data processing using a neural network based application, it may be an acceptable alternative when the neural network model being used is not too demanding, or where processing cost is a more important criterion than processing time.

In use cases in which CPU(s) 232 are used to perform data processing using neural network based application 104a or 104b, either in conjunction with GPU(s) 234, or in their stead, actions 352 and 353 may be performed for CPU(s) 232. That is to say, in some implementations, the first performance parameter used in action 352 to determine batch size may include the memory load of CPU(s) 232 during processing of test data 110/210. Moreover, in those implementations, the second performance parameter tuned in action 353 may include the usage rate of CPU(s) 232 or the memory load rate of CPU(s) 232. Thus, the first performance parameter used in action 352 may be the memory load of CPU(s) 232 and/or the memory load of GPU(s) 234 and/or the memory load rate of TPU(s) 236 during processing of test data 110/210 by machine 230. In addition, the second performance parameter tuned in action 353 may be the usage rate or the memory load rate of CPU(s) 232 and/or the usage rate or the memory load rate of GPU(s) 234 and/or the usage rate or memory load rate of TPU(s) 236.

Flowchart 350 continues with optimizing, based on the batch size determined in action 352 and the second performance parameter tuned in action 353, a process flow for performing the data processing using neural network based application 104a or 104b (action 354). Optimization of the process flow for performing data processing using neural network based application 104a or 104b may be performed by software code 228, executed by hardware processor 224 of automated hardware resource optimization system 120/220.

For example, software code 228 can group together data processing tasks that are sent to the same neural network included in neural network based application 104a or 104b to take advantage of the optimal batch size and maximize the TPU/GPU/CPU usage, thereby substantially reducing the overhead of launching each task independently. This may be especially advantageous when applied to short tasks such as image tagging. When computing hardware 106/116 identified in action 351 includes more than one machine 230, software code 228 can use the information obtained during the initial performance benchmarking to prioritize certain tasks on certain machines. As not all neural network models have the same hardware requirements, one might perform better on a machine with a CPU, another might do well with a small GPU, i.e., a relatively low speed GPU and/or one having a relatively small GPU memory, while another might need a bigger GPU having a larger GPU memory and/or capable of higher processing speeds in order to work fast, for example.

Tasks that involve the same inputs but different neural network models, such as face recognition and location recognition, for example, might benefit from sharing common preprocessing techniques, such as shot detection in videos for instance. In addition, in some implementations, more than one neural network can share some elements of a common architecture, such as one or more initial neural network layers and weights, for example. Under any of those circumstances, software code 228 may be configured to launch tasks related to the same input on the same machine in order to reuse temporal preprocessing material calculated by a first task in subsequent tasks. In some implementations, optimizing process flow in action 354 may also include determining when two or more data processing tasks can be performed concurrently, i.e., in parallel, on the same machine. This may be possible, for example, if the two or more tasks do not use the totality of the hardware resources according to the benchmark study, thereby advantageously reducing the total time required to perform the two or more tasks when compared to performing them sequentially. As a specific example, an intensive GPU or TPU exclusive task could be processed in parallel with an intensive CPU exclusive task. Thus, the data processing performed using neural network based application 104a or 104b may include multiple tasks, and the process flow optimized in action 354 may result in performance of at least some of those tasks concurrently.

In some implementations, exemplary flowchart 350 may conclude with generating configuration file 240 identifying computing hardware 116/216, neural network based application 104a or 104b, the batch size determined in action 352, the second performance parameter tuned in action 353, and the process flow optimized in action 354 (action 355). Configuration file 240 may be utilized to optimize hardware resource use when hosting neural network based application 104a or 104b using one or more machine(s) 230. Action 355 may be performed by software code 228, executed by hardware processor 224 of automated hardware resource optimization system 120/220.

Configuration file 240 may be stored in system memory 238 so it can be used again in future use cases in which the same neural network based application will be hosted by the same computing hardware. In addition, configuration file 240 may be used to facilitate future benchmarking of similar computing hardware when used to host the same or a similar neural network based application, and/or may be used to predict an optimal configuration for similar computing hardware when used to host the same or a similar neural network based application.

Figure 3B:
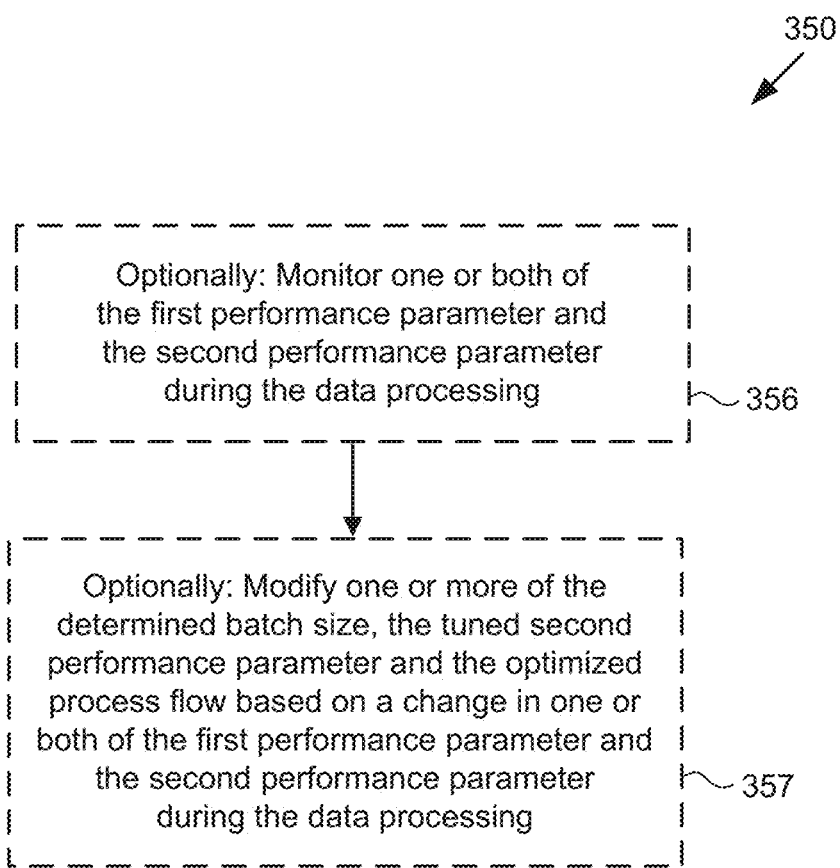
FIG. 3B presents additional optional actions that may be performed as part of the exemplary method outlined in FIG. 3A.

FIG. 3B presents additional optional actions that may be performed as part of the exemplary method outlined in FIG. 3A. Thus, although in some implementations the method outlined by flowchart 350 may conclude with action 355, in other implementations, flowchart 350 may continue with optionally monitoring one or both of the first performance parameter and the second performance parameter during data processing using neural network based application 104a or 104b hosted by computing hardware 106/116 identified in action 351 (action 356). The performance monitoring performed in action 356 may include monitoring of some performance parameters and/or substantially continuous monitoring of those same or other performance parameters. For example, action 356 may include continuously monitoring the time it takes to complete data processing tasks, while monitoring the TPU/GPU/CPU usage or memory load if and when those times start degrading, or when hardware changes are detected. In some implementation, the data collected during action 356 may be persistently stored, and may be used to detect performance degradation over time.

Monitoring the performance of the computing hardware during data processing offers the advantage of identifying processing bottlenecks in real-time as they develop. Those processing bottlenecks may develop due to poor initial benchmarking, resulting in inaccurate batch determination in action 352, mistuning in action 353, and/or a suboptimal process flow in action 354. Alternatively, bottlenecks may develop due to deterioration in the performance of one or more machine(s) 230 included among computing hardware 106/116. Action 356 may be performed by software code 228, executed by hardware processor 224 of automated hardware resource optimization system 120/220, based on performance monitoring data 114/214 received by automated hardware resource automation system 120/220 from one or more machine(s) 230.

In some implementations, flowchart 350 may continue and conclude with optionally modifying at least one of the batch size determined in action 352, the tuning of the second performance parameter tuned in action 353, or the process flow optimized in action 354 based on a change of one or both of the first performance parameter or the second performance parameter during the data processing (action 357). Action 357 results in modification of configuration file 240 to address the actual performance of machine(s) 230 included among computing hardware 106/116 identified in action 351 during data processing using neural network based application 104a or 104b. It is noted that although flowchart 350 shows action 356 as preceding action 357, in some implementations, actions 356 and 357 may be performed substantially concurrently.

In some use cases, the change in one or both of the first performance parameter and the second performance parameter may result in the development of a processing bottleneck, as discussed above. In those implementations, action 357 may be performed to resolve the bottleneck. Action 357 may be performed by software code 228, executed by hardware processor 224 of automated hardware resource optimization system 120/220.

Alternatively, or in addition, when one or more machine(s) 230 receive a software or hardware update, performance monitoring data 114/214 may be used to determine whether configuration file 240 needs to be updated as well. For example a new software version might change the processing efficiency of machine(s) 230. By monitoring queued tasks, a reduction in GPU memory 235, for example, can be detected, and benchmarking of machine(s) 230 may be repeated with the expectation of increasing the batch size.

Thus, the present application discloses automated hardware resource optimization systems and methods for use by such systems that overcome the drawbacks and deficiencies in the conventional art. In contrast to conventional approaches to optimizing neural network based application performance by optimizing the neural network architecture for the computing hardware on which it is to be hosted, the present approach advantageously renders a neural network based application effectively agnostic to the hardware hosting it by optimizing the configuration of available hardware and the process flow utilizing that hardware. That is to say, in contrast to conventional approaches, the present solution configures available computing hardware to optimize multiple distinct neural net operations, which is what is described in this invention. As a result, the present hardware resource optimization solution enables the use of heterogeneous hardware resources, including those available in a local computing environment, those available as cloud-based resources, and those used in a hybrid computing environment including a mixture of local and cloud-based computing resources. Moreover, the present hardware optimization solution advantageously enables the identification of processing bottlenecks in real-time, as well as enabling changes to a configuration file to address and resolve the bottleneck, as well as to exploit enhanced hardware efficiencies resulting from software or hardware updates.

One significant advantage over conventional approaches to optimizing neural network based application performance is that the present hardware resource optimization solution makes it possible to rely exclusively on local computing hardware for the processing of critical or otherwise sensitive data, thereby avoiding sending such data into the cloud. That is to say, the present hardware resource solution enables the advantages of scalability provided by the use of a hybrid local/cloud computing environment while selectively restricting some data processing tasks to local, on premises, computing hardware. Moreover, the present solution identifies the optimal local hardware resource element for the performance of each data processing task, thereby advantageously taking full advantage of the performance potential of the local hardware environment.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated hardware resource optimization system comprising:
    a computing platform including a hardware processor and
        a system memory storing a software code;

the hardware processor configured to execute the software code to:
- identify a computing hardware for hosting a neural network based application;
- determine, based on a first performance parameter of the computing hardware, a batch size for performing a data processing using the neural network based application;
- tune, using a data batch having the determined batch size, a second performance parameter of the computing hardware to enable substantially continuous loading of a hardware processor memory of the computing hardware;
- optimize, based on the determined batch size and the tuned second performance parameter, a process flow for performing the data processing using the neural network based application; and
- generate a configuration file identifying the computing hardware, the neural network based application, the determined batch size, the tuned second performance parameter, and the optimized process flow.

2. The automated hardware resource optimization system of claim 1, wherein the data processing comprises a plurality of tasks, and wherein the optimized process flow results in performance of at least some of the plurality of tasks concurrently.

3. The automated hardware resource optimization system of claim 1, wherein the hardware processor is further configured to execute the software code to:
- monitor at least one of the first performance parameter or the second performance parameter during the data processing; and
- modify at least one of the determined batch size, the tuned second performance parameter, or the optimized process flow based on a change of the at least one of the first performance parameter or the second performance parameter during the data processing.

4. The automated hardware resource optimization system of claim 1, wherein the first performance parameter of the computing hardware comprises at least one of a tensor processing unit (TPU) memory load, a graphics processing unit (GPU) memory load, or a central processing unit (CPU) memory load during processing of a test data.

5. The automated hardware resource optimization system of claim 1, wherein the second performance parameter of the computing hardware comprises at least one of a TPU usage rate, a TPU memory load rate, a GPU usage rate, a GPU memory load rate, a CPU usage rate, or a CPU memory load rate during processing of the data batch having the determined batch size.

6. The automated hardware resource optimization system of claim 1, wherein the neural network based application comprises a plurality of neural networks.

7. The automated hardware resource optimization system of claim 1, wherein the computing hardware comprises a plurality of machines.

8. The automated hardware resource optimization system of claim 7, wherein at least one of the plurality of machines is a cloud-based machine and at least another of the plurality of machines is part of a same local network as the automated hardware resource optimization system.

9. The automated hardware resource optimization system of claim 1, wherein the computing hardware comprises at least one machine, and wherein the automated hardware resource optimization system and the at least one machine are part of a same local network.

10. The automated hardware resource optimization system of claim 1, wherein the computing hardware comprises at least one cloud-based machine.

11. A method for use by an automated hardware resource optimization system including a computing platform having a hardware processor and a system memory storing a software code, the method comprising:
- identifying, by the software code executed by the hardware processor, a computing hardware for hosting a neural network based application;
- determining, by the software code executed by the hardware processor and based on a first performance parameter of the computing hardware, a batch size for performing a data processing using the neural network based application;
- tuning, by the software code executed by the hardware processor and using a data batch having the determined batch size, a second performance parameter of the computing hardware to enable substantially continuous loading of a hardware processor memory of the computing hardware;
- optimizing, by the software code executed by the hardware processor and based on the determined batch size and the tuned second performance parameter, a process flow for performing the data processing using the neural network based application; and
- generating, by the software code executed by the hardware processor, a configuration file identifying the computing hardware, the neural network based application, the determined batch size, the tuned second performance parameter, and the optimized process flow.

12. The method of claim 11, wherein the data processing comprises a plurality of tasks, and wherein the optimized process flow results in performance of at least some of the plurality of tasks concurrently.

13. The method of claim 11, further comprising:
- monitoring, by the software code executed by the hardware processor, at least one of the first performance parameter or the second performance parameter during the data processing; and
- modifying, by the software code executed by the hardware processor, at least one of the determined batch size, the tuned second performance parameter, or the optimized process flow based on a change of the at least one of the first performance parameter or the second performance parameter during the data processing.

14. The method of claim 11, wherein the first performance parameter of the computing hardware comprises at least one of a tensor processing unit (TPU) memory load, a graphics processing unit (GPU) memory load, or a central processing unit (CPU) memory load during processing of a test data.

15. The method of claim 11, wherein the second performance parameter of the computing hardware comprises at least one of a TPU usage rate, a TPU memory load rate, a GPU usage rate, a GPU memory load rate, a CPU usage rate, or a CPU memory load rate during processing of the data batch having the determined batch size.

16. The method of claim 11, wherein the neural network based application comprises a plurality of neural networks.

17. The method of claim 11, wherein the computing hardware comprises a plurality of machines.

18. The method of claim 17, wherein at least one of the plurality of machines is a cloud-based machine and at least another of the plurality of machines is part of a same local network as the automated hardware resource optimization system.

19. The method of claim 11, wherein the computing hardware comprises at least one machine, and wherein the automated hardware resource optimization system and the at least one machine are part of a same local network.

20. The method of claim 11, wherein the computing hardware comprises at least one cloud-based machine.

* * * * *